United States Patent [19]

Sung et al.

[11] Patent Number: 5,721,188
[45] Date of Patent: Feb. 24, 1998

[54] THERMAL SPRAY METHOD FOR ADHERING A CATALYTIC MATERIAL TO A METALLIC SUBSTRATE

[75] Inventors: Shiang Sung, New York, N.Y.; Michael P. Galligan, Clark; Patrick L. Burk, Freehold, both of N.J.

[73] Assignee: Engelhard Corporation, Iselin, N.J.

[21] Appl. No.: 373,929

[22] Filed: Jan. 17, 1995

[51] Int. Cl.$^6$ .................................................. B01J 37/025
[52] U.S. Cl. ........................ 502/439; 427/454; 427/456
[58] Field of Search ........................ 502/439; 423/212; 427/454, 456

[56] References Cited

U.S. PATENT DOCUMENTS

| | | |
|---|---|---|
| 3,067,002 | 12/1962 | Reid et al. . |
| 3,837,894 | 9/1974 | Tucker, Jr. ............................ 117/70 A |
| 4,095,003 | 6/1978 | Weatherly et al. . |
| 4,252,690 | 2/1981 | Kamiya et al. . |
| 4,405,284 | 9/1983 | Albrecht et al. . |
| 4,455,281 | 6/1984 | Ishida et al. . |
| 4,465,654 | 8/1984 | Faschingbauer . |
| 4,702,897 | 10/1987 | Onal . |
| 4,703,028 | 10/1987 | Steininger et al. . |
| 4,741,082 | 5/1988 | Kanniainen et al. . |
| 4,778,649 | 10/1988 | Niino et al. . |
| 4,822,689 | 4/1989 | Fukubayashi et al. ............... 428/472 |
| 5,010,051 | 4/1991 | Rudy ........................ 502/304 |
| 5,139,992 | 8/1992 | Tauster et al. ................. 502/304 |
| 5,158,753 | 10/1992 | Take et al. . |
| 5,204,302 | 4/1993 | Gorynin et al. . |
| 5,223,332 | 6/1993 | Quets ........................ 428/216 |
| 5,303,547 | 4/1994 | Mieville et al. . |
| 5,304,519 | 4/1994 | Jackson et al. ................. 501/103 |

FOREIGN PATENT DOCUMENTS

| | | | |
|---|---|---|---|
| 0 339 153 A1 | 11/1989 | European Pat. Off. | C23C 4/02 |
| 0 503 470 A1 | 9/1992 | European Pat. Off. | B01J 37/34 |
| 28 53 023 A 1 | 6/1979 | Germany | B01J 35/02 |
| 38 13 312 A 1 | 11/1989 | Germany | B01J 21/06 |

*Primary Examiner*—Glenn Caldarola
*Assistant Examiner*—Bekir L. Yildirim
*Attorney, Agent, or Firm*—Richard A. Negin

[57] ABSTRACT

A method for applying a coating of catalytic material onto a metallic substrate involves thermal spray deposition of refractory oxide particles directly onto the substrate, preferably to attain an undercoat having a surface roughness of Ra 3 or greater. The catalytic material may then be applied to the undercoated substrate in any convenient manner. In a particular embodiment, the metallic substrate is treated by grit blasting prior to the application of an undercoat principally containing alumina. The coated substrate can be used in the assembly of a catalyst member for the treatment of exhaust gases.

13 Claims, No Drawings

THERMAL SPRAY METHOD FOR ADHERING A CATALYTIC MATERIAL TO A METALLIC SUBSTRATE

BACKGROUND OF THE INVENTION

1. Field of the Invention

The present invention relates to the manufacture of catalytic members comprising a support substrate having catalytic material disposed thereon, and more particularly to the application to the substrate of an undercoat on which the catalytic material is deposited.

2. Related Art

In order to meet governmental emissions standards for internal combustion engine exhaust, motor vehicle manufacturers emplace catalytic converters in the exhaust gas lines of their vehicles. A common form of catalytic converter comprises a catalyst member which comprises a honeycomb monolith having gasflow passages extending there-through. The monolith carries a coating of catalytically active material which is effective to convert noxious components of the exhaust gas, which may include unburned hydrocarbons, carbon monoxide and $NO_x$, to innocuous substances. The carrier substrate may comprise ceramic or metallic material.

Commonly, catalytic material is disposed on ceramic substrates by immersing the honeycomb carrier in a washcoat slurry containing the catalytic material. A similar technique may be used with metallic substrates, but often a catalytic washcoat will not adhere as well to a metallic substrate as it will to a ceramic substrate. Accordingly, there is a need for methods to improve the adhesion between metallic substrates and catalytic materials disposed thereon.

U.S. Pat. No. 5,204,302 to Gorynin et al, dated Apr. 20, 1993, discloses a plasma spray method for preparing a catalyst member for treating exhaust gases and teaches a need to apply an adhesive sublayer to the substrate before applying the catalytically active layer comprising alumina thereon. The adhesive sublayer is prepared from thermally reactive metal powders (see column 2, lines 25 through 41) that are applied to the substrate by a plasma spray technique (see column 3, lines 6 through 15) to produce a coating that is less than 50 microns thick (see column 5, line 5). The thermally reactive powders comprise nickel, titanium, aluminum, and at least two other metals (see column 2, lines 29 through 41), and may comprise particles 20–50 microns in size (see column 9, lines 1 through 10). If air is used in the plasma chamber, oxides of these metals, including aluminum-oxides, may be formed, but a metal substrate $Ni_3Al$ is the preferred adhesive layer composition (see column 5, lines 5 through 7 to column 6, line 19). In the example, the adhesive layer was at least 20 microns thick and was prepared from a nickel-aluminum composit powder having a particle size of from 20–50 microns. The catalytically active layer comprises active alumina and a catalytically active component (see column 2, lines 4 through 25) and is applied onto the adhesive sublayer using plasma spray techniques (see column 3, lines 15 through 18 and column 6, lines 23 through 38).

U.S. Pat. No. 4,455,281 to Ishida et al, dated Jun. 19, 1984, discloses a $NO_x$ reduction catalyst for the treatment of exhaust gas, in which molten metal is sprayed through a nozzle together with a gas such as compressed air to deposit small droplets of molten metal upon a metal sustrate to roughen the substrate surface (see column 4, line 62 through column 5, line 10). A $NO_x$-reducing catalytic material is coated onto the substrate in the form of a paste or by dipping the metal plate in a slurry of the catalytic substance (see column 5, lines 24 through 30).

SUMMARY OF THE INVENTION

The present invention relates to a method for adhering a catalytic material onto a metallic substrate. The method comprises applying an undercoat by thermally spraying particles principally comprising refractory oxides directly onto the substrate and then depositing a layer of the catalytic material onto the undercoat.

According to one aspect of the invention, the method may comprise applying an undercoat having a Ra roughness greater than 3, where $Ra=(1/L) (h_1+h_2+\ldots+h_n)$, and where $h_n$ is the absolute value of the height measurement of the surface profile over a centerline, measured at each of a series of points spaced unit distance apart; L is the sampling length in those units; and the centerline is drawn so that the sum of the areas within the surface profile above the centerline is equal to the sum of those below the centerline. The method may comprise applying to the substrate an undercoat having a Ra roughness equal to or greater than 4.

According to another aspect of the invention, the undercoat may be applied to a thickness equal to at least about the average diameter size of the particles.

According to yet another aspect of the invention, the method may comprise spraying refractory particles that have a size range of about 13 to about 180 microns.

According to still another aspect of the invention, the method may comprise spraying refractory oxide particles principally comprising alumina.

Optionally, the method may comprise roughening the surface of the substrate before applying the undercoat. The catalytic material may be deposited on the undercoat by immersing the undercoated substrate in a slurry comprising particles of the catalytic material. When the catalytic material comprises a catalytic species dispersed on a support material, the catalyst material may be deposited on the undercoat by depositing a layer comprising the support material onto the undercoat, and then dispersing a catalytically active species onto the support material.

The substrate may have two sides, and the method may comprise applying the undercoat and depositing the catalytic material onto both sides of the substrate.

DETAILED DESCRIPTION OF THE INVENTION AND PREFERRED EMBODIMENTS THEREOF

The present invention relates generally to a method for treating a metallic substrate to allow for improved adhesion of a coating of catalytic material onto the substrate. The method is useful in the manufacture of catalyst members comprising catalysts useful for the treatment of exhaust gases comprising noxious pollutants including hydrocarbons, carbon monoxide and nitrogen oxides.

The metallic substrate may comprise any metallic material suitable for use as a carrier for the catalytic material. Preferably, the substrate is resistant to degradation under conditions in which the exhaust gases will be contacted with the catalytic material. Stainless steel is a suitable substrate material due to its resistance to oxidation.

According to the present invention, an undercoat is applied directly to the surface of a metallic substrate by a thermal spray process to spray particles at least principally comprising refractory oxides directly onto the substrate, i.e., without an intervening layer of sprayed metallic powder. Various suitable thermal spray processes are known in the art. One suitable thermal spray technique is plasma spraying which generally comprises passing particles of inorganic material through the flame of a plasma torch. The plasma may be produced by using an electric arc to ignite a mixture of combustible gases to produce a high temperature flame. Other suitable thermal spray techniques include flame powder spraying, in which a powder feedstock is aspirated into an oxygen/fuel-gas flame which melts the powder and carries it to the work-piece; detonation gun spraying, in which suspended powder is fed into a tube with fuel gas and oxygen, and a spark ignites the mixture which explodes and produces pressure that blasts the particles out of the tube and onto the substrate; and high velocity oxyfuel spraying, in which a powder, fuel gas and oxygen are combined and ignited in a high pressure chamber to produce a supersonic particle stream. The adhesion of an undercoat and the catalytic material to a substrate according to the present invention is superior to the adhesion of catalytic layers applied directly to a like metallic substrate by other methods such as by direct application and subsequent drying and calcining of a washcoat slurry. The particles used for the undercoat may comprise refractory oxides such as alumina, ceria, silica, titania, iron oxide, manganese oxide, alumina-titania, alumina-silica, and the like.

In a particular embodiment of the invention, the undercoat is applied by thermally spraying a powder principally comprising alumina onto the substrate. Various commercially available forms of alumina may be used.

Preferably, the particle size of the refractory oxide powder is chosen to maximize the efficiency of the thermal spray deposition process and to avoid flow blockages through the spray gun nozzle. Powders having average particle sizes of from about 13 to about 180 microns will be useful in the present invention. The undercoat layer should be applied to a thickness that assures that the substrate surface is adequately covered. Typically, this requires a thickness at least about equal to the average particle size of the oxide particles.

An effective plasma spray procedure was obtained using a 3M™ plasma gun at a 3.5 to 4.5 inch standoff, operating at 500 amps and 34 kilowatts and at a spray rate of 7 to 8 pounds of alumina powder per hour using argon as the primary gas and hydrogen as the secondary gas.

The application of the oxide particles to a substrate surface as described herein produces an undercoat that permits superior adhesion of a subsequently applied catalytic washcoat, relative to an undercoat formed via dispersing an aqueous slurry of oxide particles onto the substrate, then drying and calcining the coated substrate.

Contrary to the teachings of the prior art, it is not required that the thermal spray coat deposited directly on the substrate contain thermally reactive metal powders. Rather, the powder that produces the undercoat may consist primarily or entirely of refractory oxides, e.g., alumina.

The inventors have found that the roughness of the undercoat significantly affects the ability of the catalytic material to adhere to the substrate. Roughness can be quantified as a quantity designated Ra, which is defined mathematically as $Ra=(1/L)(h_1+h_2+\ldots h_n)$ where $h_n$ is the absolute value of the height of the surface profile above or below the center line measured at each of a series of n points spaced unit distance apart, and L is the sampling length in those units. Thus, if the height measurements are made in microns, the measurements are made one micron apart over a length of L microns. The center line is drawn such that the sum of the measurements above the line is equal to the sum of those below the line. Roughness can be measured using a profilometer, e.g., a Sutronic 3P profilometer sold by the Taylor-Hobson Company. The effect of roughness on catalytic material adhesion is seen by comparing the loss of catalytic material from undercoated substrates at different surface roughnesses. Generally, a Ra roughness of at least about 2.5 or higher, preferably 4 or higher, provides improved adhesion of the catalytic material onto the substrate in accordance with the present invention.

The Applicants have also found that surface roughness increases with undercoat thickness. For example, an undercoat having a thickness of 1 mil (25.4 microns) had a Ra roughness of about 4.5 to 5.0, an undercoat applied to a thickness of 6 mils (152.4 microns) using the same undercoat powder had a Ra roughness of about 6.5 to 7.0. In addition, using an undercoat powder comprising larger particles yields rougher undercoat surfaces. Thus, an undercoat comprising a mixture of gamma and theta alumina with an average particle size of about 60 microns had a Ra roughness of 7.0 to 7.5, versus 4.5 to 5.5 for the undercoat made with alpha-alumina particles having an average size of about 30 microns.

Preferably, before the undercoat is applied to the metal substrate in accordance with the present invention, the surface of the substrate is roughened to improve the adhesion between the undercoat and the substrate. A preferred method for roughening the surface of the substrate is to subject the surface to a grit-blasting process. Grit blasting can be suitably performed with 120 mesh alumina discharged at 25 psi with an eight inch standoff between the blasting gun and the substrate.

Once the thermally sprayed undercoat is applied to the metallic substrate, the catalytic material may be applied in any conventional manner, e.g., by applying the catalytic material to the undercoated substrate in the form of a washcoat slurry and then drying and calcining the coated substrate.

The catalytic materials that may be deposited on the undercoat may comprise any materials that are active for the conversion of the noxious components of the exhaust gas. Typically, catalytic materials useful for this purpose comprise catalytically active species dispersed on refractory inorganic oxide support materials. A wide variety of catalytically active species and support materials are known. However, a typical catalytic material useful in the treatment of exhaust gas from an internal combustion engine comprises one or more of platinum, palladium and rhodium dispersed on a support material comprising one or more of alumina, ceria, zirconia and/or other refractory inorganic oxides and combinations thereof. Other catalytically active transition metals such as chromium, iron, nickel, manganese, etc., may be dispersed with, or in place of, the platinum group metals on the support material. The catalytically active species is dispersed on the support material in any conventional manner, e.g., a soluble salt of the active species may be dissolved in an aqueous solution, and particles of the support material are impregnated with the solution. The impregnated particles are then dried and calcined to remove the water and convert the species to their catalytically active forms. A slurry is then created from these powders and additional inorganic oxides by techniques well known to those skilled in the art of preparing three-way conversion catalysts. The slurry is then coated onto the undercoated substrate. Coating may be accomplished by immersing the substrate into the washcoat slurry and removing the excess catalytic material, or by spraying the desired quantity of the washcoat slurry onto the substrate. The coated substrate is then dried and calcined. If the slurry has greater than 35% solids content, greater than 10 centipoise viscosity and spraying is performed at 20 to 25 psi and 0.3 to 0.5 ft³/ min., the drying step may be omitted.

Alternatively, the support material may be applied to the undercoated substrate before the catalytically active species are deposited thereon. The catalytically active species may then be deposited on the support material by wetting the substrate with a solution comprising one or more salts of the catalytically active species and drying and calcining the wetted substrate to disperse the catalytically active species onto the support material. This latter technique allows for precise control of the loading of catalytically active species on the substrate. Optionally, multiple layers of catalytic material may be applied, one on top of the other, to the undercoated substrate.

The catalytically active species are deposited onto the support material in a quantity designed to provide a desired quantity of catalytically active species per unit of volume of the finished catalyst member, given a suitable loading of the catalytic material on the carrier substrate. For example, in a catalytic material comprising platinum group metals as the active species for use in the treatment of automotive exhaust gases, the platinum group metals are typically deposited onto the refractory inorganic support material in a quantity sufficient to provide from about 0.1 to about 600 grams per cubic foot of the catalyst member, given a washcoat loading on the substrate of from about 0.25 to about 4.0 grams per cubic inch. It is advantageous to employ a catalytic material comprising a refractory oxide support material of about the same composition as the undercoat particles, so that the catalytic material will have substantially the same coefficient of thermal expansion as the undercoat. In this way, the finished catalyst member will encounter a minimum of stress in the event of thermal shock.

The coated substrate may be physically modified, either before or after the undercoat is applied, into a form convenient or advantageous for the manufacture of a flow-through catalyst member therefrom. For example, the substrate may be made into the form of a corrugated metal sheet that can be sandwiched between flat separator sheets which contact the substrate periodically at the crests of the corrugations. Thus, gas flow channels are defined between the corrugated sheets and the separator sheets. By stacking a number of such substrates in this manner, a suitable honeycomb-type carrier may be prepared.

For a single-pass catalyst member, both the corrugated substrates and the separator sheet substrates can be coated on both sides with the same materials. An alternative configuration for a single-pass catalyst member is shown in U.S. Pat. No. 4,741,082 to Kanniainen et al, the disclosure of which is hereby incorporated herein by reference. Briefly restated, the patent teaches that a honeycomb monolith can be formed by disposing a flat metal on a corrugated metal sheet and by winding the layered sheets about a central shaft. The windings are then secured together by inserting shafts therethrough at each end of the monolith.

Alternatively, a catalyst member can be assembled from substrate sections having other physical configurations, e.g., from perforated substrate plates or from expanded metal substrate sheets, i.e., sheets into which an array of slits have been made and onto which force has been applied to open the slits into flow-through passages. By altering the physical configuration of a previously flat substrate to a corrugated, perforated or other configuration, catalytic performance is generally enhanced because such alterations tend to disrupt laminar flow of the gas flowing through the catalyst member. The preparation of some such flow-through catalyst members is described in, e.g., aforementioned U.S. Pat. No. 4,455,281, at column 4, lines 1 through 35, and in FIGS. 3 through 13, which are hereby incorporated herein by reference.

A typical honeycomb carrier is dimensioned and configured to provide from about 300 to about 600 gas flow channels per cross-sectional square inch.

On the other hand, as is known in the art, it is possible to construct a crossflow carrier using alternating flat separator sheets and corrugated sheets and alternating the orientation of the corrugated sheets so that the corrugations of each sheet are disposed crosswise, e.g., orthogonally, at right angles to the corrugations of the adjacent corrugated sheets. In such case, the corrugations of the sheets that are aligned will define a first plurality of gas flow channels through the catalyst member, and the corrugations of the other corrugated sheets will define a second plurality of gas flow channels disposed crosswise to the first plurality. Generally, the monolith is constructed so that gas flowing through one plurality of channels cannot seep or flow into the other plurality of channels from within the monolith.

It may be desirable to apply a different catalytic material to the substrates forming the first plurality of channels from those formaing the second plurality of channels, and to leave the separator sheets uncoated, or coated differently on each side. The crossflow monolith can be disposed in a housing having an inlet and an outlet and being dimensioned and configured so that gas flowing through the inlet passes through the first plurality of channels, then through the second plurality of channels, and then through the outlet. The catalytic materials encountered by the exhaust gases in the first and second pluralities of gas flow channels may be the same, or may be different, if this will enhance the performance of the catalyst member. In addition, a catalyst member so constructed can be employed as a heat exchanger, so that high temperature gases entering the first plurality of channels can supply heat to the catalytic material, and thus enhance the catalytic activity of the second plurality of channels. Optionally, one of the first and second pluralities of channels may contain an adsorbent in place of a catalytic material, to adsorb noxious components of the exhaust gases until such time as a catalytic material is better able to purify them. The construction of a crossflow monolith using corrugated and flat sheets is known in the art as shown in, e.g., U.S. Pat. No. 3,929,419, to Chapman, dated Dec. 30, 1975, the disclosure of which is hereby incorporated herein by reference. The Chapman Patent also shows a housing suitable for appropriately controlling the flow of gases through a first plurality of passages and then through a second plurality of passages.

As illustrated in the following examples, a coating of catalytic material applied to a substrate in accordance with the present invention will exhibit superior adherence to the substrate relative to similar coatings applied by other methods. This superior performance can be achieved utilizing a thermal spray process only for the undercoat, and therefore requires only a minimum of specialized equipment. The catalytic material will not be lost via spalling or other processes in which it might be blown off the substrate after repeated thermal cycles.

EXAMPLE 1

A plate of a stainless steel alloy obtained from Allegheny Ludlum Steel Company under the trade designation Alpha-4™ and measuring 6 in.×6 in. was subjected to a plasma spray process by spraying a powder comprising 99.47% alumina, 0.39% $Na_2O$, 0.05% silica and 0.03% $Fe_2O_3$, in hexagonal platelet particles in the size range of from about 13 to 51 microns, with an average particle size of about 27 microns, into the stream of a plasma torch fired onto the plate, to provide an undercoat having a thickness of 1.0 mils thereon. The undercoated plate and a comparative uncoated alloy plate measuring 6.5 in.×4.25 in. were both coated with a slurry of a catalytic material comprising platinum group metals disposed on refractory inorganic support particles comprising alumina. The slurry comprised 49% solids, had a viscosity of 235 cps and a pH of 4.7, and was applied to the plates using an air gun that blew air at about 0.3 to 0.5 $ft^3$/hr at a pressure of 20 psi. The plasma-coated plate, designated E-1, had a total loading of catalytic material of 1.7 grams, corresponding to 61.0 $mg/in^2$, whereas the untreated plate, designated C-1, had a loading of catalytic material of 0.8 grams, corresponding to 22.0 $mg/in^2$. The plates were subjected to thermal shock by raising the temperature to 1000° C. for ten minutes, then allowing the plates to cool. The thermal shock was imposed on the plates five times in succession. Then, the integrity of the catalytic material coating was tested by blowing air on the plates using a 25 psi air gun at 120 $ft^3$/hr and at a distance of 4 inches from the plates. The plates were weighed before and after treatment with the air gun, and the weight loss was recorded. The air gun removed 0.004 grams of catalytic material from the plasma-treated plate E-1, whereas 0.042 grams of catalytic material were lost from the non-treated plate C-1. This shows that a catalyst substrate prepared in accordance with the present invention maintains the superior adhesion of a catalytic material thereon even after being subjected to thermal shock.

EXAMPLE 2

Two plasma-coated plates measuring 6 in.×6 in. were prepared as described above in Example 1, except that one plate, designated E-2, had an alumina undercoating that was 1.0 mil thick, whereas the alumina undercoating on the other plate, designated E-3, was 0.5 mils thick. The catalytic material was applied to plate E-2 at a coating weight of 22.0 $mg/in^2$, for a total weight of 0.8 grams on a plate. The loading of catalytic material on plate E-3 was 28.0 $mg/in^2$, for a total loading of 1.0 gram. After drying and calcining, the catalytic material on plate E-2 adhered well to the plate, whereas the catalytic material on plate E-3 could be rubbed off. Scanning electron microscope photographs of cross sections of the plates showed that the coating of catalytic material on plate E-2 had a uniform thickness, as did the alumina undercoating. A similar photograph of plate E-3 showed that both the alumina undercoating and the coating of catalytic material were spotty and irregular. The average particle size of the alumina particles was 27 microns, this Example shows that an undercoat thickness should be about equal to the average particles to attain a satisfactory coating.

EXAMPLE 3

A test plate E-4 was prepared in accordance with Example 1, and a comparative plate C-2 was prepared by applying a plasma spray coating of an alloy known as FeCrAlloy, which comprises 10–20% chromium, 1–5% aluminum alloy, and balance iron, onto the plate to a thickness of one mil. The metal used was stainless steel Alpha-4™ alloy and was corrugated. The catalytic material was spraycoated onto the plates in a slurry having a pH of 4.1, and solids concentration of 48.6 and a viscosity of 500 cps. The loading of catalytic material on plate E-4, which measured 3½ in.×2⅞ in., was 80.0 $mg/in^2$, whereas the loading of catalytic material on plate C-2, which measured 4³⁄₁₆ in.×3¼ in., was 91.0 $mg/in^2$. After drying and calcining, the catalytic material on plate E-4 was smooth whereas the coating of catalytic material on plate C-2 had visually evident cracks. The adherence of catalytic material was tested by blowing the plates with an air gun, and plate E-4 suffered a loss of 0.5% of the catalytic material, whereas 10% of the catalytic material was blown off plate C-2.

This Example demonstrates that a plasma undercoating principally comprising alumina was superior to that of a plasma undercoating comprising a metal alloy.

EXAMPLE 4

A catalyst member E-5 was prepared in accordance with the present invention using an Alpha-4™ stainless steel alloy corrugated sheet having corrugations that correspond to 400 cells per square inch, onto which an alumina undercoating of 1.0 mils was applied by the plasma spray method, described above. A catalytic material comprising platinum group metals deposited on alumina-containing particles was dispersed in a slurry having a pH of 3.0, a solids concentration of 45% and a viscosity of 75 cps and was applied to the test plate. The final loading of catalytic material on the plate was 78 $mg/in^2$, and it exhibited good adhesion to the alumina undercoating.

A comparative flat plate C-3 was prepared by applying a coating of alumina by plating aluminum onto the plate and oxidizing the particulate layer to provide a layer of alumina having a thickness of 2000–3000 Angstroms on the plate. The catalytic material was applied to the comparative plate at to a loading of 38 $mg/in^2$. After drying and calcining, the catalytic material did not adhere to plate C-3 as well as to plate E-5.

EXAMPLE 5

Three substrate plates were prepared by first roughening their surfaces by grit blasting with 120 mesh alumina at 25 psi and at an 8-inch stand-off. An undercoat was applied to each roughened plate using different undercoat materials to obtain an undercoat thickness of about 1 mil. Plate E-6 was undercoated with a commercially available alumina material obtained from the Praxair Company under the commercial designation LA-6; plate E-7 was undercoated with a commercially available alumina obtained from the Metro Company under the commercial designation 105 SFP; and plate E-8 was coated with the alumina material used for plate E-1. The roughness of each undercoat was measured using a Sutronic 3P profilometer. A coating of catalytic material was applied to the undercoated plates and to an uncoated plate, and after drying and calcining, the plates were tested with an air gun, and the weight loss of catalytic material was measured as a percentage of the catalytic material loading. The results are set forth in TABLE I.

TABLE I

| Sample | Ra Roughness (Microns) | Percent Loss of Catalytic Material |
| --- | --- | --- |
| uncoated plate | 0.5 | >10 |
| E-6 | 2.5–3.0 | 4.8 |
| E-7 | 4.0–4.5 | 0.5 |
| E-8 | 4.5–5.5 | 0.4 |

The data of TABLE I show that undercoats of greater roughness provide better adhesion of catalytic material which is reflected as a lower percentage loss. In particular, superior adhesion is attained at Ra roughnesses greater than 3.0, especially at Ra equal to or greater than 4.0.

While the invention has been described in detail with respect to specific preferred embodiments thereof, it is to be understood that upon a reading of the foregoing description, variations to the specific embodiments disclosed may occur to those skilled in the art and it is intended to include such variations within the scope of the appended claims.

What is claimed is:

1. A method for adhering a catalytic material onto a metallic substrate, comprising:

applying an undercoat by thermally spraying particles consisting essentially of at least one refractory oxide directly onto the substrate, the undercoat having a Ra roughness greater than 3, where $Ra=(1/L)(h_1+h_2+\ldots h_n)$, and where $h_n$ is the absolute value of the height measurement of the surface profile over a centerline measured at each of a series of n points spaced unit distance apart, L is the sampling length in those units, and the centerline is drawn so that the sum of the areas within the surface profile above the centerline is equal to the sum of those below the centerline and then depositing a layer of the catalytic material onto the undercoat.

2. The method of claim 1 comprising applying to the substrate an undercoat having a Ra roughness equal to or greater than 4.

3. The method of claim 1 including applying the undercoat to a thickness equal to at least about the average diameter size of the particles.

4. The method of claim 3 wherein the refractory particles have a size range of about 13 to 180 microns.

5. The method of claim 1 wherein the refractory oxide particles principally comprise alumina.

6. The method of claim 1 further comprising roughening the surface of the substrate before applying the undercoat.

7. A method for adhering a catalytic material onto a metallic substrate, comprising:

(a) applying an undercoat by thermally spraying particles principally comprising alumina having a size range of about 13 to 180 microns directly onto the substrate to a thickness equal to at least the average particle size of the particles, to obtain an undercoat have an Ra roughness of at least about 3 where Ra is defined as $Ra=(1/L)(h_1+h_2\ldots h_n)$, where $h_n$ is the absolute value of the height measurement of the surface profile over a centerline measured at each of a series of n points spaced unit distance apart, L is the sampling length in those units, the centerline is drawn so that the sum of the areas within the surface profile above the centerline is equal to the sum of those below the centerline; and (b) depositing a layer of the catalytic material onto the undercoated substrate.

8. The method of claim 7 further comprising pretreating the metallic substrate to roughen the surface before applying the undercoat.

9. The method of claim 8 wherein pre-treating comprises grit blasting the substrate.

10. The method of claim 7 wherein step (b) comprises immersing the undercoated substrate in a slurry comprising particles of the catalytic material.

11. The method of claim 7 wherein the catalytic material comprises a catalytically active metal species dispersed on a support material, and wherein step (b) comprises depositing a layer comprising the support material onto the undercoat, and dispersing the catalytically active species onto the support material.

12. The method of claim 1 or claim 7 wherein the substrate has two sides, the method comprising applying the undercoat and depositing the catalytic material onto both sides of the substrate.

13. The method of claim 1 wherein the refractory oxide is selected form the group consisting of alumina, ceria, silica, titania, iron oxide, manganese oxide, alumina-titania and alumina-silica.

* * * * *